United States Patent
Karstens

(10) Patent No.: US 7,789,314 B2
(45) Date of Patent: Sep. 7, 2010

(54) PROTECTION OF OPTICALLY ENCODED CONTENT USING ONE OR MORE RFID TAGS EMBEDDED WITHIN ONE OR MORE OPTICAL MEDIAS

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/846,107

(22) Filed: Aug. 28, 2007

(65) Prior Publication Data

US 2009/0057404 A1   Mar. 5, 2009

(51) Int. Cl.
G06K 19/06 (2006.01)

(52) U.S. Cl. .............. 235/492; 235/487; 369/53.21

(58) Field of Classification Search ........... 235/487, 235/492
See application file for complete search history.

(56) References Cited

U.S. PATENT DOCUMENTS

| | | | | |
|---|---|---|---|---|
| 5,905,798 A * | 5/1999 | Nerlikar et al. | .............. | 705/57 |
| 6,005,940 A * | 12/1999 | Kulinets | .............. | 705/51 |
| 6,356,517 B1 * | 3/2002 | Liu et al. | .............. | 369/14 |
| 6,542,444 B1 * | 4/2003 | Rutsche | .............. | 369/14 |
| 6,902,111 B2 * | 6/2005 | Han et al. | .............. | 235/454 |
| 7,038,985 B2 * | 5/2006 | Ryal | .............. | 369/53.21 |
| 7,292,147 B2 * | 11/2007 | Benedikt | .............. | 340/572.7 |
| 7,292,512 B2 * | 11/2007 | Ryal | .............. | 369/53.21 |
| 7,317,396 B2 * | 1/2008 | Ujino | .............. | 340/572.1 |
| 7,382,254 B2 * | 6/2008 | Posamentier | .............. | 340/572.1 |
| 7,385,284 B2 * | 6/2008 | Carrender | .............. | 257/692 |
| 7,497,385 B2 * | 3/2009 | Forster et al. | .............. | 235/492 |
| 7,540,000 B2 * | 5/2009 | Kwong et al. | .............. | 720/600 |
| 2003/0105970 A1 * | 6/2003 | Pei Jen | .............. | 713/200 |
| 2005/0180566 A1 * | 8/2005 | Ryal | .............. | 380/57 |
| 2005/0270964 A1 * | 12/2005 | Ujino | .............. | 369/274 |
| 2006/0015752 A1 * | 1/2006 | Krueger | .............. | 713/193 |
| 2006/0071795 A1 * | 4/2006 | Benedikt | .............. | 340/572.7 |
| 2006/0077062 A1 * | 4/2006 | Andrechak et al. | .............. | 340/572.8 |
| 2006/0109123 A1 * | 5/2006 | Carrender | .............. | 340/572.1 |
| 2006/0109130 A1 * | 5/2006 | Hattick et al. | .............. | 340/572.7 |
| 2006/0132309 A1 * | 6/2006 | Posamentier | .............. | 340/572.1 |
| 2006/0174353 A1 * | 8/2006 | Ryal | .............. | 726/31 |
| 2006/0290509 A1 | 12/2006 | Forster et al. | | |
| 2007/0001852 A1 * | 1/2007 | Jalkanen et al. | .............. | 340/572.1 |
| 2007/0171066 A1 * | 7/2007 | Fein et al. | .............. | 340/572.1 |

* cited by examiner

*Primary Examiner*—Daniel A Hess
*Assistant Examiner*—Paultep Savusdiphol
(74) *Attorney, Agent, or Firm*—Patents on Demand, P.A.; Brian K. Buchheit

(57) ABSTRACT

The present invention discloses a solution for protection of optically encoded content using one or more Radio Frequency Identification (RFID) tags embedded within one or more optical medias. The solution can include an RFID tag embedded within an optical media that can manage the use of the optically encoded content on the optical media. Protection can include access control of optically encoded media by an optical media drive, progressive content based protection, selective content access and the like. In one embodiment the embedded RFID tag can act independently or in concert with hardware/software security mechanisms associated with an optical media drive to provide security.

19 Claims, 2 Drawing Sheets

PROTECTION OF OPTICALLY ENCODED CONTENT USING ONE OR MORE RFID TAGS EMBEDDED WITHIN ONE OR MORE OPTICAL MEDIAS

BACKGROUND

1. Field of the Invention

The present invention relates to media content protection, and more particularly, to protection of optically encoded content using one or more RFID tags embedded within one or more optical medias.

2. Description of the Related Art

Unauthorized duplication of information on optical media is a problem for many companies. Currently, copy protection largely relies upon software security measures to reduce and prohibit unauthorized duplication. Software mechanisms often depend on encrypting or scrambling content which is unscrambled using a special key. Often, these keys are discoverable, guessable, or circumvent-able, which renders the copy protection useless resulting in extensive copying of the once-protected content. For example, the Content Scramble System (CSS) designed to protect digital video disk (DVD) content was circumvented using the DeCSS software algorithm. In another example, the advanced access content system (AACS) that protect HD DVD and BLU-RAY disks already has been reportedly circumvented.

Other anti-copying attempts have resulting in devastating side effects, which harmed content providers and users alike. For instance, in 2005 SONY briefly distributed rootkit software (e.g., Extended Copy Protection and MediaMax CD-3) on audio compact disks. This rootkit software was automatically installed on desktop computers when customers attempted to play CDs on their computers. The rootkit software was designed to interfere with a normal way in which an operating system plays CDs. It also had a side effect of opening security holes that allowed viruses to invade the desktop computers that had attempted to play the music CDs. The end result was a massive recall of rootkit containing CDs, many lawsuits, and negative public sentiment focused on the unannounced rootkit additions.

Despite the challenges with protecting optically encoded content, unabated duplication is a major source of financial cost to companies that deploy content on optical media. What is needed is a more secure technique to protect optically encoded software that does not harm legitimate content consumers.

SUMMARY OF THE INVENTION

The present invention discloses a solution for protection of optically encoded content using one or more Radio Frequency Identification (RFID) tags embedded within one or more optical medias. The solution can include one or more RFID tags embedded within one or more optical medias that can manage the use of the optically encoded content on the optical media. Protection can include access control of optically encoded media by an optical media drive, progressive content based protection, selective content access and the like. In one embodiment the embedded RFID tag can act independently or in concert with hardware/software security mechanisms associated with an optical media drive to provide security.

The present invention can be implemented in accordance with numerous aspects consistent with the material presented herein. For example, one aspect of the present invention can a secure optical media that includes optically encoded content contained within the secure optical media. The secure optical media can also include at least one Radio Frequency Identification (RFID) tag. The RFID tag can include tag encoded content. At least a portion of the optically encoded content can be secured by the tag encoded content.

Another aspect of the present invention can include an optical media drive that includes an optical reader and an RFID reader. The optical reader can read optically encoded content stored in optical media. The RFID reader can read tag encoded content stored in at least one RFID tag embedded in optical media. At least a portion of the optically encoded content can be secured by the tag encoded content.

Still another aspect of the present invention can include a method for securing optical media. The method can include a step of identifying an optical media that includes at least one embedded RFID tag. Tag encoded content can be read from the embedded RFID tag. The tag encoded content can be processed to selectively unlock otherwise secured optically encoded content of the optical media.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
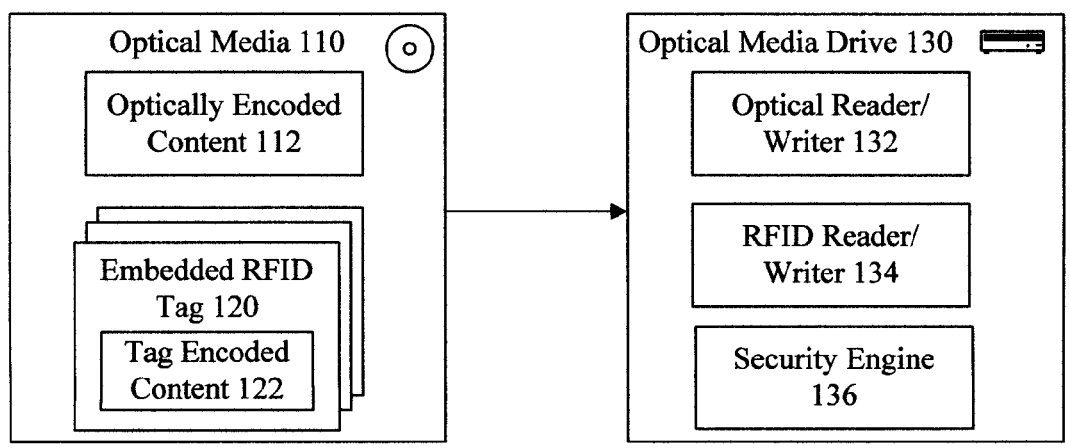
FIG. 1 is a schematic diagram illustrating a system for protection of optically encoded content using an embedded Radio Frequency Identification (RFID) tag in accordance with the embodiment of inventive arrangements disclosed herein.

FIG. 1 is a schematic diagram illustrating a system 100 for protection of optically encoded content using an embedded Radio Frequency Identification (RFID) tag in accordance with the embodiment of inventive arrangements disclosed herein. In system 100, an optical media 110 can contain optically encoded content 112 and one or more embedded RFID tag 120, which can contain RFID encoded content 122. Security information in the RFID encoded content 122 can be required to fully access the optically encoded content 112. Use of an embedded RFID tag 120 to protect the optically encoded content 112 can result in inherent additional security benefits. For example, removal/replacement of an embedded RFID tag 120 would likely damage the optically encoded content 112, rendering it unusable.

System 100 is not limited to protecting optically encoded content 112 of media 110 specifically containing embedded RFID tags 120. Instead, a set of optical media 110 can be protected using tag encoded content 122 contained in tags 120 embedded within one or more of the disks of the set. For example, a computer game can include a set of five disks, which are all protected using one or more RFID tags 120 embedded in a first disk. Further, different tag 120 storage areas can be used to protect different disks, such as a first area protecting disk one, a second area—disk two, a third area—disk three, and so on. Different storage areas can be contained in the same tag 120 or in different tags 120. In another configuration, a common storage area in tag 120 can be used to protect all the disks in a set of disks.

The RFID embedded media 110 can be accessed by an optical media drive 130. The drive 130 can include an optical media reader 132 for reading the optically encoded content 122 and a RFID reader 134 for reading the tag encoded content 122. Either the optical reader 132 or the RFID reader 134 can optionally include content writing components, which enable content to be written to optical media and/or RFID media. The optical media drive 130 can optionally include a security engine 130, which is configured to selectively grant access to optically encoded content 112 based upon correct access information being included in the tag encoded content 122.

An ability to write content to the embedded RFID tags 120 can result in numerous advantageous side benefits. For example, data specific to optically encoded content 112 can be saved directly to the media 110 and automatically used regardless of which drive 130 or computer the media 110 is inserted into. For example, high scores, game state data (e.g., character level, items carried, game location, etc.), and the like can be stored in the media 110 versus storing user specific information in a stationary player. A writeable portion of the tag encoded content 122 can store bookmarks, documents, user files, preferences, state information, and other data.

The security information in the tag encoded content 122 can protect any type of optically encoded content 112 at a variety of access levels. Additionally, the security information in the tag encoded content 122 can protect other RFID tag encoded content located on the same optical media or different optical media. RFID protected content can include, but is limited to, video, music, software, data, games, and the like. The security can prevent or limit a manner in which protected content can be read, copied, or written. The same level of protection can be imposed on all operations of the protected optically encoded content 112, or different levels can be imposed against selective portions of the content 112. In one embodiment, a portion of the optically encoded content 112 can be unprotected so that the content 112 is usable in a limited fashion, where full use of the content 112 requires a protected portion of the content be unlocked using security information from tag encoded content 122. For instance, the one or more chapters of a movie or one or more levels of a video game can be locked, so that viewing the locked chapter or level requires the security information.

Numerous security technologies can be implemented to protect the optically encoded content 112, which include software and/or hardware security technologies. In one implementation, the optically encoded content 112 can be encrypted, where a decryption key is contained in the tag encoded content 122. In one embodiment, a multi-part security key can be used, where one part of the key is contained in the tag encoded content 122. Another part of the multi-part key can be stored in the optically encoded content 112, in a separate documents (e.g., an activation key), in a network accessible storage space (e.g., in an embodiment that requires network based activation), in an optical media drive 130, in a different RFID tag 120, in a different portion of the same tag 120, and/or any other location. A multi-part key can include two or more parts, each of which are needed for unlocking the protective restrictions imposed on the content 112.

To illustrate, a read-only portion of the tag encoded content 122 can include a first security key, a product key can be required during installation of optically encoded content 112 (e.g., software), and a network based activation key can be required during an activation step. Activating via the activation key can write a special activation-specific code to a writable portion of the embedded RFID tag 120. Use of installed software can require the media 110 be placed in a drive 130 and that the activation-specific code written in the content 122 be present. This example illustrates one contemplated multi-stage, multi-code activation utilization process and the invention is not to be limited in this regard. In another example, activation of the media 110 can require a user designated password, which can be written to either the content 112 or content 122. Future uses of the media 110 or specific restricted actions (e.g., software installation actions, information copying, etc.) involving the media 110 can require that a user provide the password.

In one embodiment, the RFID security information in content 122 can be paired/synchronized/mated to content 112 or a type of content 112. For example, an RFID tag 120 can be matched to video content 112, which permits the content to be played, but not moved, copied, or other operations. In another embodiment, a particular video title can be mated with a particular RFID tag 120, so that different video titles have different characteristic security information for accessing the title embedded in the tag encoded content 122. In another embodiment, the media 110 can be locked to a specific type of drive 130 via a drive 130 specific code that is paired to a code in the media 110 stored in the content 112 and/or 122. For example, special media 110 can be designed for a gaming platform having platform specific drives 130, which prevents standard drives 130 from accessing and/or manipulating content 112.

In still another embodiment, the drive 130 can automatically detect tag 120 positioning and quantity within the optical media 110, which can serve as an additional protection mechanism. For example, DVD media 110 can position tags 120 in one location, which is different than a position for software media 110. Restrictions for copying content can be imposed based upon the tag 120 position. Tag positioning and quantity information can be standardized for different types of content, or can vary. Variances can be specified within the content 112 and/or 122, so that the drive 130 can access whether a proper configuration for the media 110 is present. In one embodiment, when the drive 130, specifically the security engine 136 of the drive, detects an incorrect number or positioning of RFID tags 120, security actions can be taken that prevent content 112 from being utilized.

To illustrate, two RFID tags 120 can be embedded in media 110; one on an inner edge and the other on the outer edge. A security scheme can be enacted so that only one of the tags is to be unlocked/readable at a time. Different portions of optically encoded content 112 can be associated with each tag 120. The security scheme can programmatically and periodically change which tag is unlocked/readable over time, which protects/unprotects a corresponding portion of the optically encoded content 112. If a tag that is supposed to be locked/unreadable is instead readable, the security scheme can secure all content of the media. The security scheme that requires one or more RFID tags 120 to be selectively locked can prevent a creation/use of fraudulent "unlocked media 110." "Unlocked media 110" as used in this context can refer to RFID tag containing optical media analogous to unlocked cards for satellite receivers, where the unlocked satellite cards fraudulently circumvented satellite security measures that enabled free access to for-pay channels.

In still another embodiment, when a predetermined number of errors, which can be any number 1 . . . N, is detected, some or all of the optically encoded content 112 can be more permanently or semi-permanently locked or disabled. For example, code stored in the RFID tag 120 can prevent the optically encoded content 112 from being read. In one configuration, disabled content 112 can be accessed by calling a service agent and/or contacting a media unlocking Web service, which can provide a code to re-enable disabled media 110. Re-enabling disabled media 110 can require product/user identification/verification actions. Disabling optical media can make brute force determinations of security settings difficult.

Multiple security schemes can be concurrently implemented in system 100 for increased content protection. For example, a hardware (device 130) security scheme can be established that reads/writes security information to/from the tag encoded content 122. A title based scheme (software) can mate a title of the media 110 encoded in the content 112 against corresponding security information contained in content 122. The title-based scheme and the hardware security scheme can be independent of each other. In another embodiment, a collaboration/cooperation can occur among different hardware/software imposed security schemes. For example, an ability to write content to the RFID tag 120, which is part of a hardware scheme, can be dependent upon whether the title of media or an optical security code in content 112 matches a corresponding code contained in tag encoded content 122.

The optical media 110 can include any media capable of storing optically encoded information. The optical media 110 can be pressed media that includes optically encoded content 112 when manufactured, or burned media that is manufactured in a blank state and optically encoded content 112 is thereafter added to the media 110 or "burned" into the media. Writable media 110 can be write-once media or re-writable media. The optical media 110 can have any number of content containing layers. The optical media can include, but is not limited to, compact disks (CDs), digital video disks (DVDs), BLU-RAY disks, HD disks, and the like. Multiple tags 120 and/or weights can be positioned to balance the optical media, so that's spin is not negatively effected by a presence of the tag 120. In one embodiment, tags 120 can be positioned near a center of media 110. The tag 120 itself can be of any shape, which includes a circular shape, which can be used to prevent spin biasing. The RFID tag 120 can be completed embedded within a substance of the media 110 and/or can have one or more surface protrusions.

The drive 130 can be any consumer electronic device or device peripheral able to selectively read content 112 and 122. In one embodiment, the device assembly/housing can be arranged to prevent RFID tags 120 from being artificially attached to an optical media. The RFID tags 120 can be clipped or formed so that external readers/writers (other than drive 130) are unable to read/write tag encoded content 122. The drive 130 can be a special purpose drive specifically designed for media 110 having an embedded tag 120 or can be a multi-purpose drive able to read/write information from optical media not including an embedded RFID tag 120.

Figure 2:
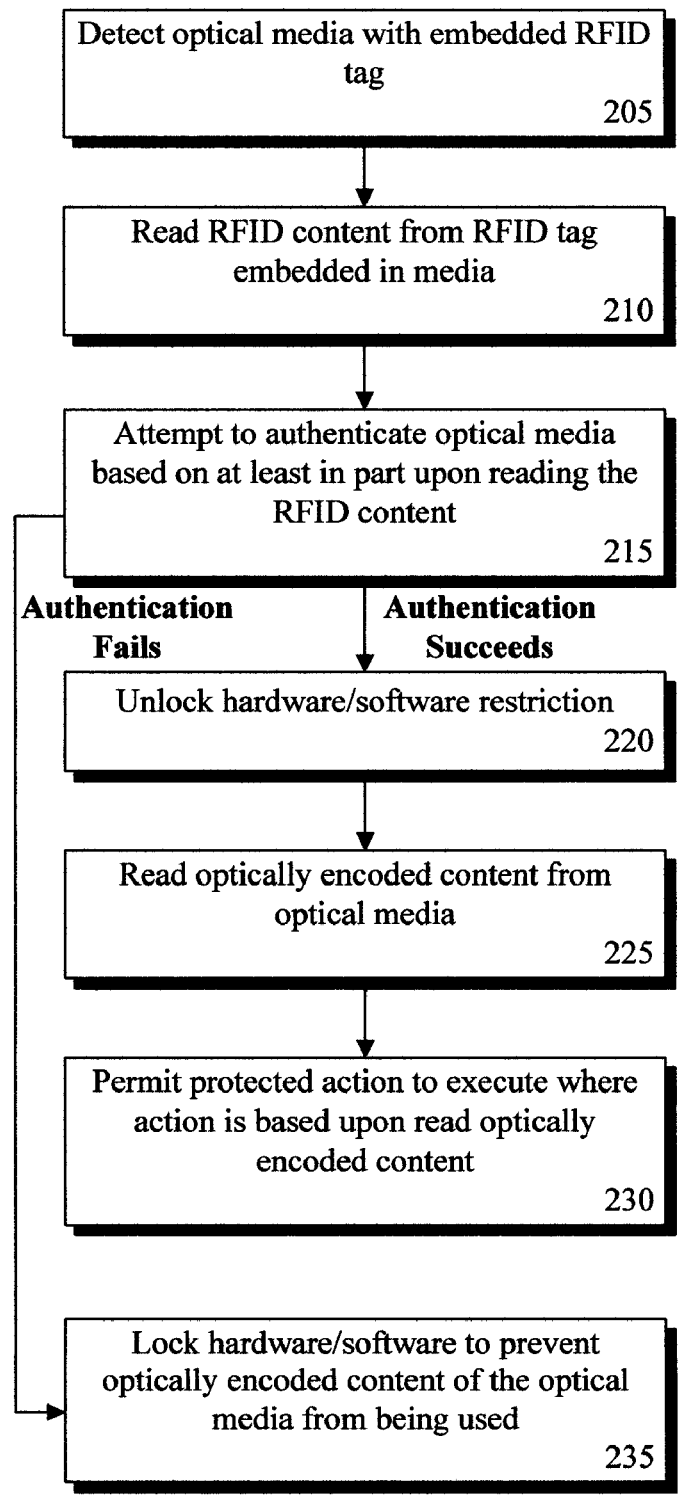
FIG. 2 is a flowchart illustrating a method for protection of optically encoded content using RFID tag embedded within optical media in accordance with the embodiment of inventive arrangements disclosed herein.

FIG. 2 is a flowchart illustrating a method 200 for protection of optically encoded content using RFID tag embedded within optical media in accordance with the embodiment of inventive arrangements disclosed herein. The method 200 can be performed in the context of system 100.

Method 200 can begin in step 205, where an optical drive detects an optical media with an embedded RFID tag. RFID encoded content can be read from the RFID tag as shown by step 210. In step 215, an attempt can be made to authenticate the optical media based on at least in part upon reading the RFID content. In the determining step 215, if the authentication fails, the method can proceed to step 235. In step 235, the optical media can lock hardware/software present to prevent optically encoded content from being used. If step 215 succeeds and authentication is successful, the method can proceed to step 225. In step 225, the optically encoded content is read from the optical media. Step 230 can grant permission of protected optically encoded content to be utilized.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A secure optical media comprising:
 optically encoded content contained within one or more secure optical medias; and
 at least one Radio Frequency Identification (RFID) tag embedded into at least one of the secure optical medias comprising tag encoded content, wherein at least a portion of the optically encoded content is secured by the tag encoded content, wherein the optically encoded content is software encrypted, wherein a decryption key for the software encrypted optically encoded content is contained within the tag encoded content, and wherein the tag encoded content including said decryption key is able to be directly read by an external RFID reader of an optical media drive that includes an optical reader for reading the optically encoded content, wherein a security engine external to the secure optical media selectively decrypts the software encrypted optically encoded content using the decryption key of the tag encoded content, wherein the secure optical media lacks a hardware processor capable of executing programmatic instructions, and
 wherein the at least one Radio Frequency Identification (RFID) tag embedded comprises a plurality of Radio Frequency Identification (RFID) tags, wherein a quantity of the plurality of Radio Frequency Identification (RFID) tags serves as an additional protection mechanism, wherein the security engine external to the secure optical media takes security actions to prevent the software encrypted optically encoded content from being utilized when an incorrect quantity of Radio Frequency Identification (RFID) tags are detected for the secure optical media.

2. The secure optical media of claim 1, wherein the tag encoded content is contained within a read-only portion of the RFID tag, wherein the RFID tag further comprises a writable portion, wherein data specific to the optically encoded content unrelated to security or encryption is stored on the writable portion of the RFID tag, which is used to store user files, user preferences, and state information for a user.

3. The secure optical media of claim 1, wherein the tag encoded content restricts copying of the optically encoded content, wherein the software encrypted optically encoded data comprises a computing game, wherein the RFID tag further comprises a writable portion, wherein game state data for the computing game is stored on the writable portion of the RFID tag.

4. The secure optical media of claim 1, wherein an unlocked portion of the optically encoded content is accessible and is not secured by the tag encoded content, wherein the unlocked portion of the optically encoded content makes the unlocked portion usable in a limited fashion, wherein the limited fashion permits an initial part of the optically encoded media to be used, wherein the software encrypted optically encoded content continues playback or interactions begun using with unlocked portion.

5. The secure optical media of claim 1, wherein the at least one Radio Frequency Identification (RFID) tag is located in different previously established positions relative to the secure optical media, wherein different positioning of the Radio Frequency Identification (RFID) tag is established for different types of content, wherein the position of the Radio Frequency Identification (RFID) tag serves as an additional protection mechanism, wherein the security engine external to the secure optical media takes security actions to prevent the software encrypted optically encoded content from being utilized when an incorrect position of Radio Frequency Identification (RFID) tag is detected.

6. The secure optical media of claim 1, wherein the tag encoded content is configured to unlock a physical component that reads the optically encoded content, wherein the physical component is locked in absence of the tag encoded content.

7. The secure optical media of claim 1, wherein the one or more secure optical medias comprises a set of two or more secure optical medias, wherein the set comprises optically encoded content needed for a computer program optically encoded within the secure optical medias, wherein only one of the secure optical medias comprises the Radio Frequency Identification (RFID) tag, which comprises the decryption key used for decrypting the software encoded optically encoded content of each secure optical media of the set of security optical medias.

8. The secure optical media of claim 1, wherein the RFID tag comprises an RFID writable portion, wherein use of the optically encoded content comprising software requires activation during installation by providing a network based activation key, wherein activating via the network based activation key causes a special activation specific code to be written to the RFID writable media, wherein use of the installed software requires the secure optical media be place in a drive and requires that the activation specific code be present and readable from within the RFID writable media.

9. An optical media drive comprising:
   an optical reader configured to read optically encoded content that is software encrypted and stored in optical media; and
   a Radio Frequency Identification (RFID) reader configured to read tag encoded content stored in at least one RFID tag embedded in optical media, wherein the tag encoded content contains a decryption key that is directly read by the RFID reader, wherein at least a portion of the optically encoded content is secured by the tag encoded content;
   a security engine configured to decrypt the software encrypted optically encoded content read by the optical reader using the decryption key of the tag encoded content that was directly read by the Radio Frequency Identification (RFID) reader, wherein the optical media lacks a hardware processor capable of executing programmatic instructions, and
   wherein the at least one Radio Frequency Identification (RFID) tag embedded comprises a plurality of Radio Frequency Identification (RFID) tags, wherein the security engine is operable to determine a quantity of a plurality of Radio Frequency Identification (RFID) tags present in the optical media, wherein the quantity of the plurality of Radio Frequency Identification (RFID) tags serves as an additional protection mechanism, wherein the security engine takes security actions to prevent the software encrypted optically encoded content from being utilized when an incorrect quantity of Radio Frequency Identification (RFID) tags are detected for the optical media.

10. The optical media drive of claim 9, further comprising:
    an optical content writer configured to write optically encoded content to writeable media, wherein content written by the optical content writer is secured by tag embedded content of a RFID tag, which is readable by the RFID reader; and
    a RFID writer configured to write RFID encoded content to RFID tags of at least one RFID tag embedded in optical media, wherein the RFID writer writes an activation code into the RFID tags responsive to activation of installed software, wherein use of the installed software reader requires a corresponding optical media be inserted into the optical media drive and the activation code be read from the RFID tag by the RFID reader.

11. The optical media drive of claim 9, further comprising:
    a security engine configured to physically prevent the optical media drive from reading optically encoded content unless the RFID reader detects an authorizing code within tag embedded content of the embedded RFID tag.

12. The optical media drive of claim 9, further comprising:
    the security engine configured to execute a software/firmware programmatic instructions that prevent optically encoded content from being meaningfully extracted unless the RFID reader detects an authorizing code within tag embedded content of the embedded RFID tag, which is used to software/firmware unlock the optically encoded content.

13. The optical media drive of claim 9, wherein the optically encoded content on media readable by the optical reader is secured with a two part key, one part of which is stored in the optically encoded content of the readable media, wherein another part of the two part key is contained in the tag encoded content on media readable by the RFID reader, wherein the security engine is operable to determine a position of a Radio Frequency Identification (RFID) tags and a type of content contained in of the optically encoded content, wherein different positioning of the Radio Frequency Identification (RFID) tag is established for different types of content, wherein the position of the Radio Frequency Identification (RFID) tag serves as an additional protection mechanism, wherein the security engine external to the secure optical media takes security actions to prevent the software encrypted optically encoded content from being utilized when an incorrect position of Radio Frequency Identification (RFID) tag is detected.

14. A method for securing optical media comprising:
- identifying an optical media comprising at least one embedded RFID tag and comprising optically encoded content, wherein the optically encoded content is software encrypted;
- reading, via an RFID reader of a drive in which the optical media is inserted, tag encoded content from the embedded RFID tag, wherein a decryption key for the software encrypted optically encoded content is contained within the tag encoded content;
- processing, at a security engine external to the optical media, the tag encoded content to selectively unlock otherwise secured optically encoded content of a secure optical media, wherein the selectively unlocking comprises decrypting the software encrypted optically encoded content using the decryption key of the tag encoded content, and
- wherein the at least one Radio Frequency Identification (RFID) tag embedded comprises a plurality of Radio Frequency Identification (RFID) tags, wherein a quantity of the plurality of Radio Frequency Identification (RFID) tags serves as an additional protection mechanism, wherein the security engine external to the secure optical media takes security actions to prevent the software encrypted optically encoded content from being utilized when an incorrect quantity of Radio Frequency Identification (RFID) tags are detected for the secure optical media.

15. The method of claim 14, wherein the optical media comprises a plurality of different RFID tags, wherein the security engine is only able to activate or unlocked one of the plurality of different RFID tags at a time, wherein a different portion of the optically encoded content is decrypted depending upon which of the plurality of different RFID tags is active, wherein at least one of the RFID tags must be locked at all times, else the security engine will prevent use of the optically encoded content.

16. The method of claim 14, wherein the secured optically encoded content comprises a hardware unlock code, said method further comprising:
- utilizing the hardware unlock code of the tag encoded content to unlock a physical device; and
- the unlocked physical device reading the optically encoded content of the optical media.

17. The method of claim 14, further comprising:
- accessing an unsecured portion of the optically encoded content, which permits a user to partially use the optical media for its intended purpose; and
- only unlocking a secured portion of the optically encoded content needed for full use of the optical media when an unlock code is contained within the tag encoded content.

18. The method of claim 14, further comprising:
- extracting a first part of a multi-part security key from the tag encoded content;
- extracting a second part of a multi-part security key from the optically encoded content; and
- unlocking the otherwise secured optically encoded content using the first part and the second part, decrypting a plurality of optical media disks in a related set of disks and optically encrypted content therein using the decryption key from the one optical media disks.

19. The method of claim 14, further comprising:
- detecting an error during the reading or processing step, said error preventing the secured optically encoded content from being unlocked;
- increasing an error count responsive to the detecting step;
- when the error count exceeds a previously established limit, activating a software element included in the tag encoded content; and
- said software element disabling the optically encoded content so that the method is unable to perform at least one of the reading and processing steps on the optical media.

* * * * *